United States Patent [19]

Bell et al.

[11] Patent Number: 5,103,254
[45] Date of Patent: Apr. 7, 1992

[54] CAMERA WITH SUBJECT HIGHLIGHTING AND MOTION DETECTION

[75] Inventors: Cynthia S. Bell, Webster; Martin A. Parker, Penfield, both of N.Y.

[73] Assignee: Eastman Kodak Company, Rochester, N.Y.

[21] Appl. No.: 529,832

[22] Filed: May 29, 1990

[51] Int. Cl.⁵ .................. G03B 7/093; G03B 7/28; G03B 13/32; G03B 17/20
[52] U.S. Cl. .................. 354/409; 354/430; 354/456; 354/471
[58] Field of Search ......... 354/430, 219, 266, 456, 354/227.1, 471, 474, 475, 289.1, 289.12, 75, 76, 429, 432, 409; 358/96, 105, 125, 224, 225, 226, 209, 909, 222, 227

[56] References Cited

U.S. PATENT DOCUMENTS

| | | | |
|---|---|---|---|
| 3,690,234 | 9/1972 | Costianes | 354/430 |
| 3,706,851 | 12/1972 | Froelich et al. | 358/96 |
| 3,724,349 | 4/1973 | von Belvard et al. | 354/227.1 X |
| 4,330,797 | 5/1982 | Yokokawa et al. | 358/224 |
| 4,571,627 | 2/1986 | Stempeck | 358/224 |
| 4,772,945 | 9/1988 | Tagawa et al. | 358/105 X |
| 4,805,018 | 2/1989 | Nishimura et al. | 358/125 X |
| 4,862,777 | 8/1989 | Iwaibana | 358/222 |
| 4,933,758 | 6/1990 | Saito et al. | 358/96 X |
| 4,939,581 | 6/1990 | Shahit | 358/224 X |
| 4,949,117 | 8/1990 | Van Heyningen et al. | 358/224 X |
| 5,051,770 | 9/1991 | Cornuejols | 354/432 |

Primary Examiner—W. B. Perkey
Attorney, Agent, or Firm—Edward Dugas

[57] ABSTRACT

A camera having highlighting for the subject of the photograph and detection of motion of the subject. The camera detects the scene electronically and digitally stores the scene in memory. A gradient operation is performed on elements in the image to produce an indication of the outline of the subjects witin the depth of field. This outline may then be used to highlight the subjects in the viewfinder using an LCD as a mask. The outline may also be used to determine any movement of the subject in order to prevent blur or used as a trigger in a burst exposure mode.

31 Claims, 15 Drawing Sheets

| 122 | 207 | 19 | 138 | 140 | 139 | 241 | 211 | 39 | 129 | .... |
|---|---|---|---|---|---|---|---|---|---|---|
| 120 | 207 | 20 | 138 | 139 | 139 | 240 | 210 | 40 | 129 | .... |
| 117 | 206 | 19 | 11 | 139 | 138 | 240 | 210 | 39 | 128 | .... |
| 117 | 206 | 19 | 11 | 139 | 138 | 240 | 210 | 39 | 128 | .... |
| 122 | 207 | 19 | 138 | 140 | 139 | 241 | 211 | 39 | 129 | .... |
|  |  |  |  |  |  |  |  |  |  | .... |
|  |  |  |  |  |  |  |  |  |  | .... |
|  |  |  |  |  |  |  |  |  |  |  |

*FIG. 5A*

| 0 | 1 | 1 | 0 | 0 | 1 | 0 | 1 | 0 | .... |
|---|---|---|---|---|---|---|---|---|---|
| 0 | 1 | 0 | 0 | 0 | 1 | 0 | 1 | 0 | .... |
| 0 | 1 | 0 | 1 | 0 | 1 | 0 | 1 | 0 | .... |
| 0 | 1 | 0 | 0 | 0 | 1 | 0 | 1 | 0 | .... |
|  |  |  |  |  |  |  |  |  | .... |
|  |  |  |  |  |  |  |  |  | .... |
|  |  |  |  |  |  |  |  |  | .... |
|  |  |  |  |  |  |  |  |  |  |

*FIG. 6*

| 122 | 207 |
|---|---|
| 120 | 207 |

*FIG. 5B*

| x,y | x,y+1 |
|---|---|
| x+1,y | x+1,y+1 |

*FIG. 5C*

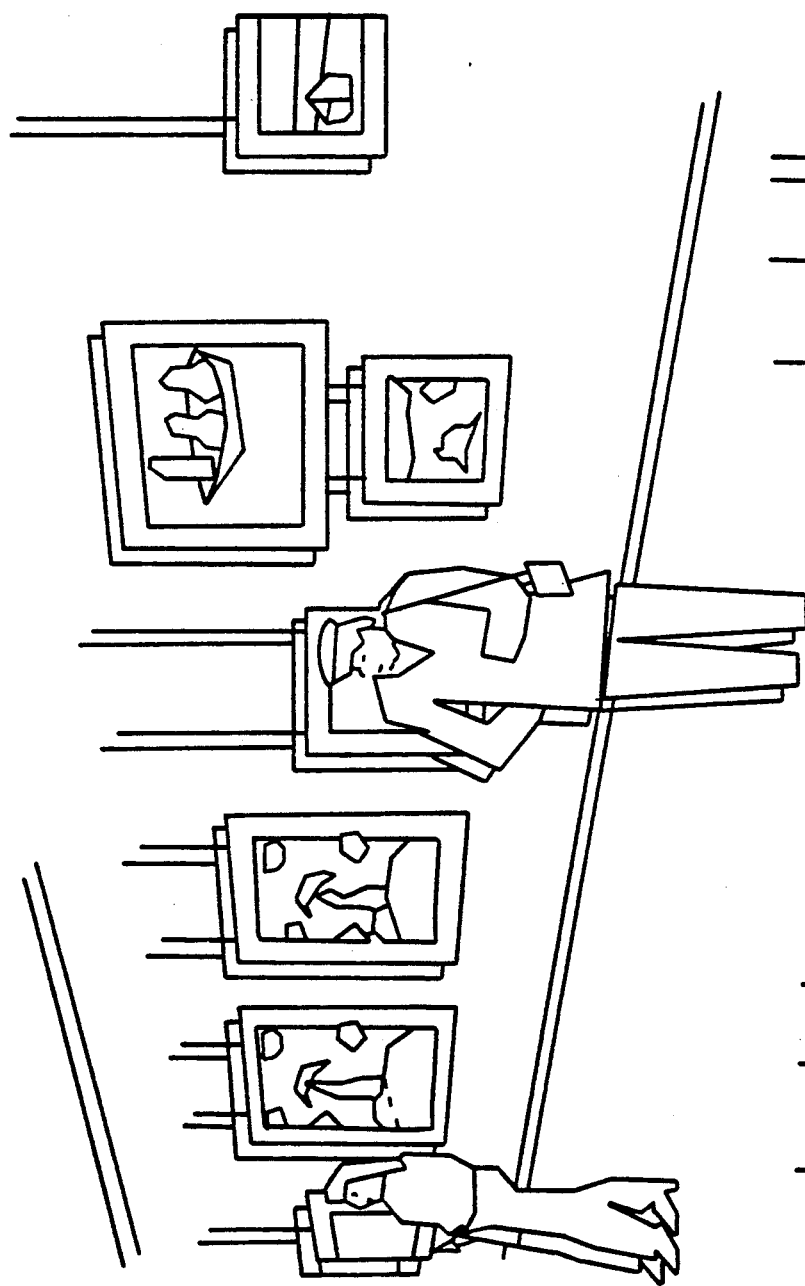
FIG. 10a
FIG. 10b
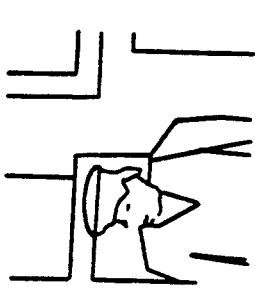
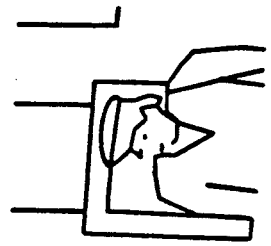
FIG. 10c

CAMERA WITH SUBJECT HIGHLIGHTING AND MOTION DETECTION

BACKGROUND OF THE INVENTION

1. Field of the Invention

The present invention relates generally to a photographic camera with autofocus and more particularly to an autofocus camera where the subject is highlighted in the viewfinder.

2. Discussion of the Background

Cameras are known which both record an image on photographic film and also produce an image electronically. In general, these cameras include not only traditional optics and film handling mechanisms for the film but also include a solid state imager to view the image electronically. The electronic image may be used to autofocus, to meter the scene lighting or to preview a scene before exposing the film or also to review a shot following the exposure to ascertain that the composition in the picture is correct.

U.S. Pat. No. 4,742,369 shows a camera having both photosensitive film and a solid state image element. This camera as well as other prior art includes basically two separate systems to record the film and the electronic image.

A more advanced camera has recently been described in copending U.S. application Ser. No. 288,887, now U.S. Pat. No. 4,949,117. In this device, the electronic and film recording mechanisms are integrated so as to form a less expensive and less complicated device. This camera also has a number of functions which are controlled by the solid state image sensor. Thus, functions such as exposure control and autofocus can be accomplished. Furthermore, the image sensed electronically can also be displayed to the operator. However, this camera does not provide for an additional indication of the subjects which are in the depth of field of the camera at the time of film exposure.

Thus, in prior art devices, it is usually necessary for the operator to determine whether the depth of field is sufficient by observing that the subjects of interest are not blurred in the viewfinder. However, this is a difficult task since, in a depth of field preview mode, the image may be generally dim and thus hard to clearly observe and especially difficult to determine the amount of blur of the subject as compared to the background. Thus, it is often difficult for operators to determine that the proper subjects are in focus.

SUMMARY OF THE INVENTION

It is therefore, an object of the present invention to provide a novel camera which indicates the subject selected by the autofocus.

It is a further object of this invention to provide a camera which highlights the subject selected by the autofocus so that it is easily judged by the operator.

It is a further object of this invention to provide a camera which highlights the subjects that are within the depth of field so that it is easily judged by the operator.

A still further object of this invention is to provide a camera which determines the outline of the subject by using a gradient function.

Another object of the present invention is to provide a camera which detects motion of the subject based on the movement of an outline provided by a gradient function.

It is a still further object of this invention to adjust the shutter speed based on the amount of motion of the subject.

It is a still further object of the present invention to provide a camera with burst exposure with the pictures being separated by a uniform amount of movement of the subject.

It is another object of the invention to provide a camera with a gradient calculation function for determining the outline of the subject picked by the autofocus and highlighting the object in the viewfinder to provide better accuracy for the operator in determining the subject.

Briefly, these and other objects of the invention are achieved by providing a solid state image sensor and memory in which to store the image. The individual pixels are then withdrawn from memory and a gradient function calculated and stored again. This information is used to determine the outline of the subject which is then highlighted in the viewfinder using a display. Consecutive outlines may be used to detect motion of the subject. The motion detection may be used to trigger a burst exposure mode or to adjust the shutter speed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5a is a diagram showing the contents of memory 68 shown in FIG. 4.

FIG. 5b is a diagram showing the contents of four elements of the memory in the upper left-hand corner of FIG. 5a.

FIG. 5c is a diagram showing the relation between the gradient operator and the elements shown in FIG. 5b.

FIG. 6 is a diagram showing the contents of memory 68 after the data is processed.

FIG. 10a shows the same scene as FIG. 8 where the camera has been moved.

FIGS. 10b and 10c show a portion of the image in 15a at the two different times.

DESCRIPTION OF THE PREFERRED EMBODIMENT

Figure 1:
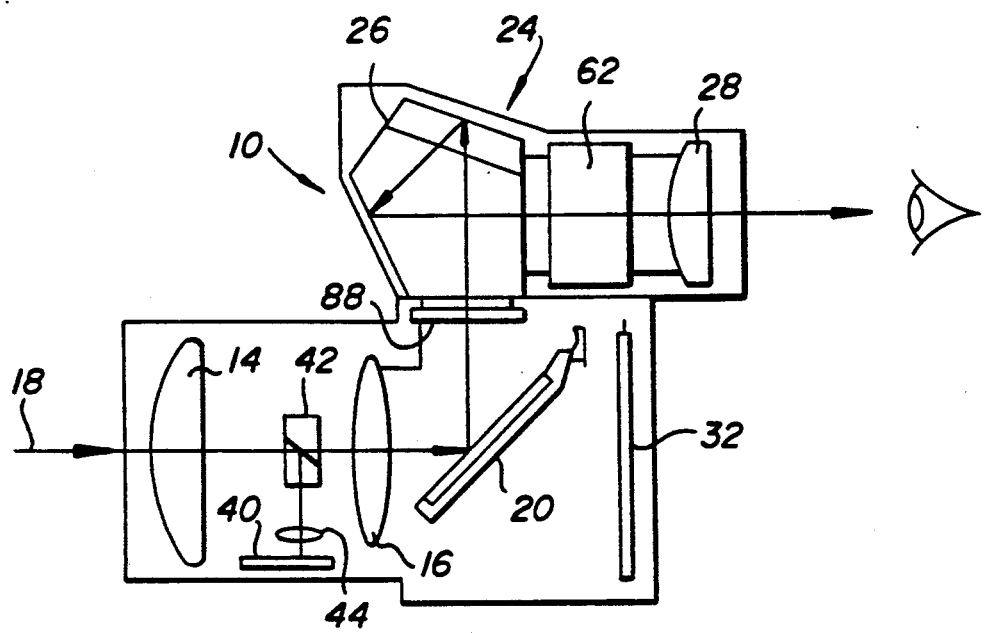
FIG. 1 is a schematic overall view of a camera in which the present invention may be used.

Various other objects, features and attendant advantages of the present invention will be more fully appreciated as the same becomes better understood from the following detailed description when considered in connection with the accompanying drawings in which like reference characters designate like or corresponding parts throughout the several views and in particular, FIG. 1, which shows the overall arrangement of a camera in which the present invention may be utilized. The camera 10 includes optical elements 14 and 16 which are disposed along an axis 18. Incoming light is carried along this axis and reflected by mirror 20 onto a ground glass viewing screen 88. The image on this screen may be viewed through viewfinder 24 which includes a prism 26, display 62 and eyepiece 28. When a shot is to be taken, the mirror 20 pivots upwardly to a horizontal position so as to expose film 32.

A solid state image sensor 40 is also provided which receives light from beam splitter 42 which is placed on the optical axis 18. The light is focused onto the sensor by means of lens 44. The camera includes a number of other parts, which are not shown in the figures for the sake of clarity. Although the present invention is shown in conjunction with a camera having film and a solid state imager, it could also be used for cameras having totally electronic sensors.

In operation, then, the operator views the subject of the photograph in a normal fashion by looking through the viewfinder 24. In addition to viewing the image, the image is also sensed electronically by way of the image sensor 40. The operator may then bring the autofocus and other functions into operation in a standard fashion such as by pushing the shutter release button, 76, half way down. When this occurs, the sensed image is stored in memory and a gradient operator acts on the stored image to produce an outline of the subjects which are in focus. This outline is then used to drive the LCD mask, 62, which highlights the subjects in the focal plane selected by the autofocus. This mask provides a bright image overlay to the viewed image so that the subject selected by the autofocus or the subjects in the depth of field appear brighter than the background in the viewfinder. Once the operator has ascertained that the correct subjects are sharp, he may then continue pressing the shutter release button to complete the photograph.

The sensor can be a charge-coupled device (CCD) such as an interline CCD image sensor, number KAI-0280, manufactured by Eastman Kodak Company of Rochester, New York. This type of sensor uses photo diodes as the image sensing elements. However, other types of sensors could be used as well.

Figure 2:
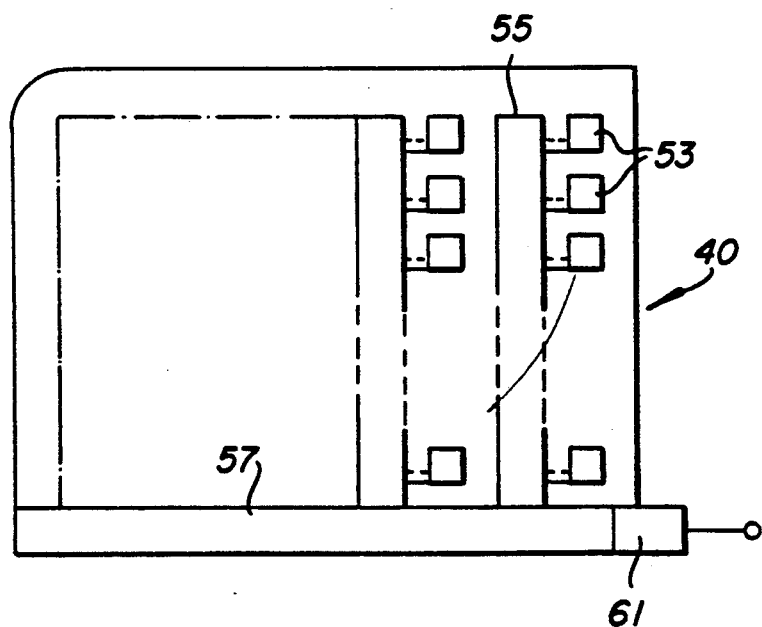
FIG. 2 is a schematic of a solid state image sensor used in the present invention.

FIG. 2 shows the arrangement of the photo diodes 53 in a matrix on the sensor 40. The photo diodes are connected to a series of vertical shift registers 55. The charge collected on each photo diode is transferred to the corresponding shift register and then transported to a single horizontal shift register 57. An output section 61 converts the charge to a voltage signal. Clock signals are provided to shift the registers at appropriate times.

Figure 3:
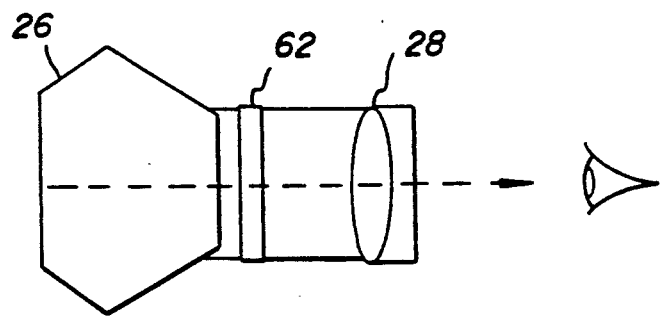
FIG. 3 is a schematic of the viewfinder display and optical coupler as viewed from the top.

FIG. 3 shows the arrangement of the viewfinder 24 in more detail. As indicated in FIG. 1, the viewfinder includes prism 26 and eyepiece 28 through which the subject may be viewed. At the same time, a liquid crystal display array 62 acts as a mask for highlighting the subject. Preferably the array is an encapsulated type such as those manufactured by Taliq Corporation, Sunnyvale, California since they do not rely on polarizers and thus avoid a brightness loss. Moreover, other types of liquid crystal displays such as standard nonencapsulated-types could also be used. The light from the scene passes through the LCD array to produce an image which is a combination of the true viewfinder scene and the LCD array mask. Where necessary, the array 62 may be replaced by a half-silvered mirror and an array placed off to the side with the mirror acting to combine the viewfinder scene and the produced array mask. The LCD image may be merely a rectangle or other figure superimposed on the subject or may follow the subject outline so as to make the object stand out and be brighter. It would also be possible to dim the subject outline. The highlighting may be done for the subject selected by the autofocus or for all subjects within the depth of field in the scene.

Figure 4:
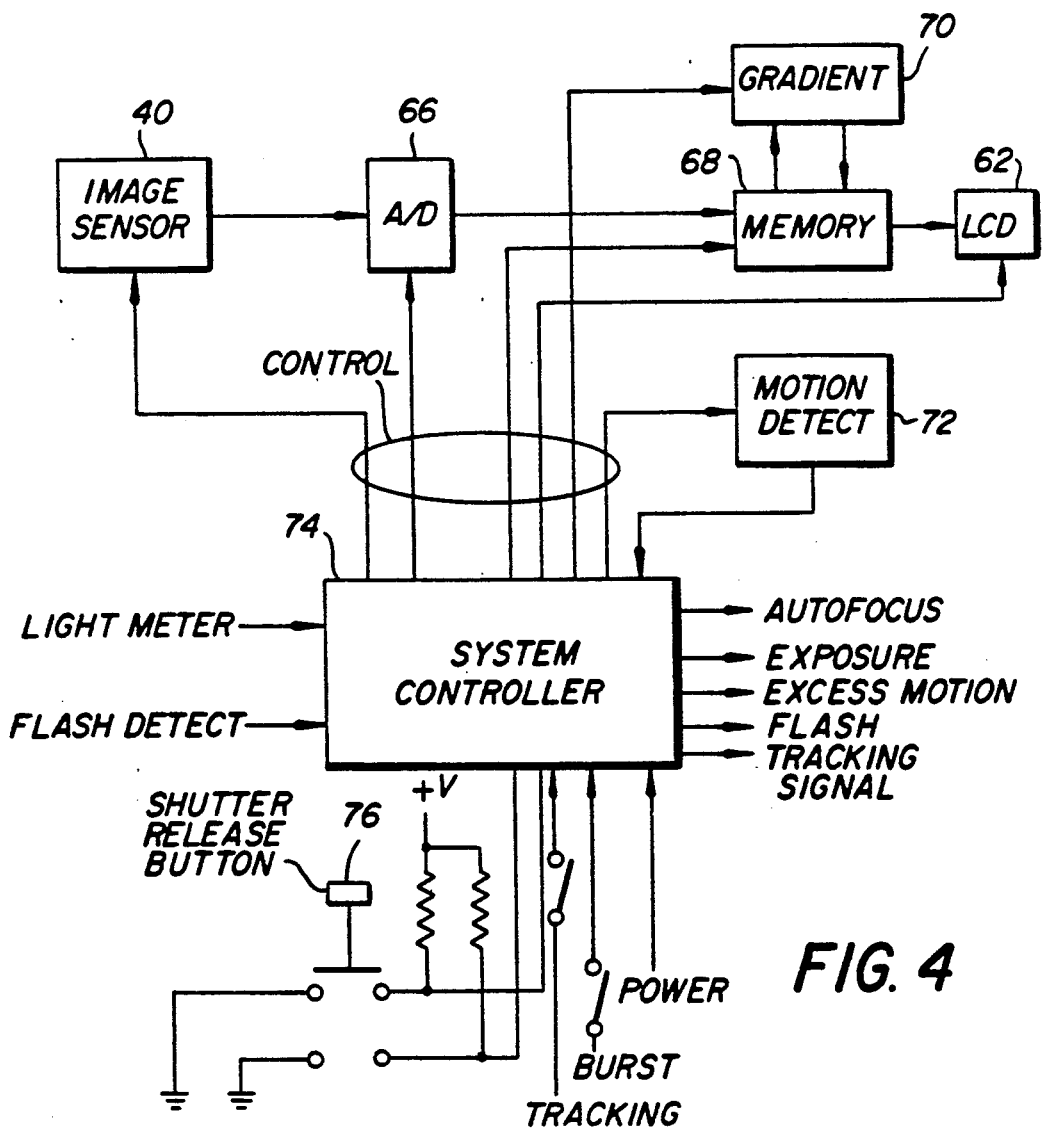
FIG. 4 is a block diagram of the present invention.

FIG. 4 is a block diagram indicating the processing of the data for producing the mask image. Image sensor 40 produces electrical signals indicative of the images as explained above. The signals are converted to digital signals in an A-D converter 66. The digital signals are then stored in memory 68. The various pixels which make up the image are then retrieved from memory and processed by the gradient operator 70 in a known fashion. The gradient technique shown in FIG. 16a, steps 100 to 124 inclusive, involves taking a pixel and three of its nearest neighbors to perform the gradient operation such as:

$$f(x,y) = |(x,y)-(x+1,y+1)| + |(x+1,y)-(x,y+1)|$$

System controller 74 is the traditional controlling device for all the operations of the camera. Thus, the controller is connected to the shutter release button, 76, to indicate whether the button is depressed either half way or the entire way and also receives other indications such as whether the burst mode is requested or not. Standard inputs such as light meter readings and flash indicaters may also be received. Other inputs, such as a signal to indicate that subject tracking is desired, may also be received. In return, the controller directs the firing of the flash, controls the exposure and controls other functions such as the autofocus. Other indications may also be given such as a warning of excessive motion or instructions to a camera mount for tracking the image. The controller may also provide appropriate timing and data movement control to the image sensor, memory, gradient operator and LCD display.

FIG. 5A shows the contents of memory 68 for a particular image. The numbers in each block indicate the digital signals which are stored. FIG. 5b reproduces the four elements of the upper left-hand corner in FIG. 5a. FIG. 5c relates the x and y designations from the above equation to these four elements. Thus, in calculating the gradient operation function in this case for the upper left element:

$$f(1,1) = |122-207| + |120-207| = 172$$

The result of the gradient operation is compared to a threshold number, "Th", a system and scene dependent number to discriminate between significant and insignificant contrast change. The value k represents a fixed, but system dependent percentage which is applied to the scene dynamic range; dynamic range is ascertained by monitoring the scene data is it passes to the memory. For example, let "Th" equal 185; for each memory element where the result of the gradient operation is less than 185 a zero is stored. For those elements where the result of the gradient operation is equal to or greater than 185 a one is stored.

FIG. 6 shows the memory storing the results of the gradient operation and thresholding functions. This gradient operator function is in the nature of a differentiation of the image and thus produces high values at the edges of subjects which are contrasty. Thus, edges of blurred images give a much lower value and areas of the same intensity give a zero value. The threshold operation then acts to retain only the elements having the highest values. Accordingly, outlines of images are formed by this gradient operation and only strong outlines formed from images which are in focus are retained after thresholding. Thus, the stored values of the gradient operation form an outline of the objects which are in focus. When desired, the outline image may be read out of memory 68 and supplied to the LCD display 62 in order to produce a mask which outlines the subject and the points which are within that outline.

Figure 8:
FIG. 8 shows the scene of FIG. 7 after gradient processing.
Figure 9:
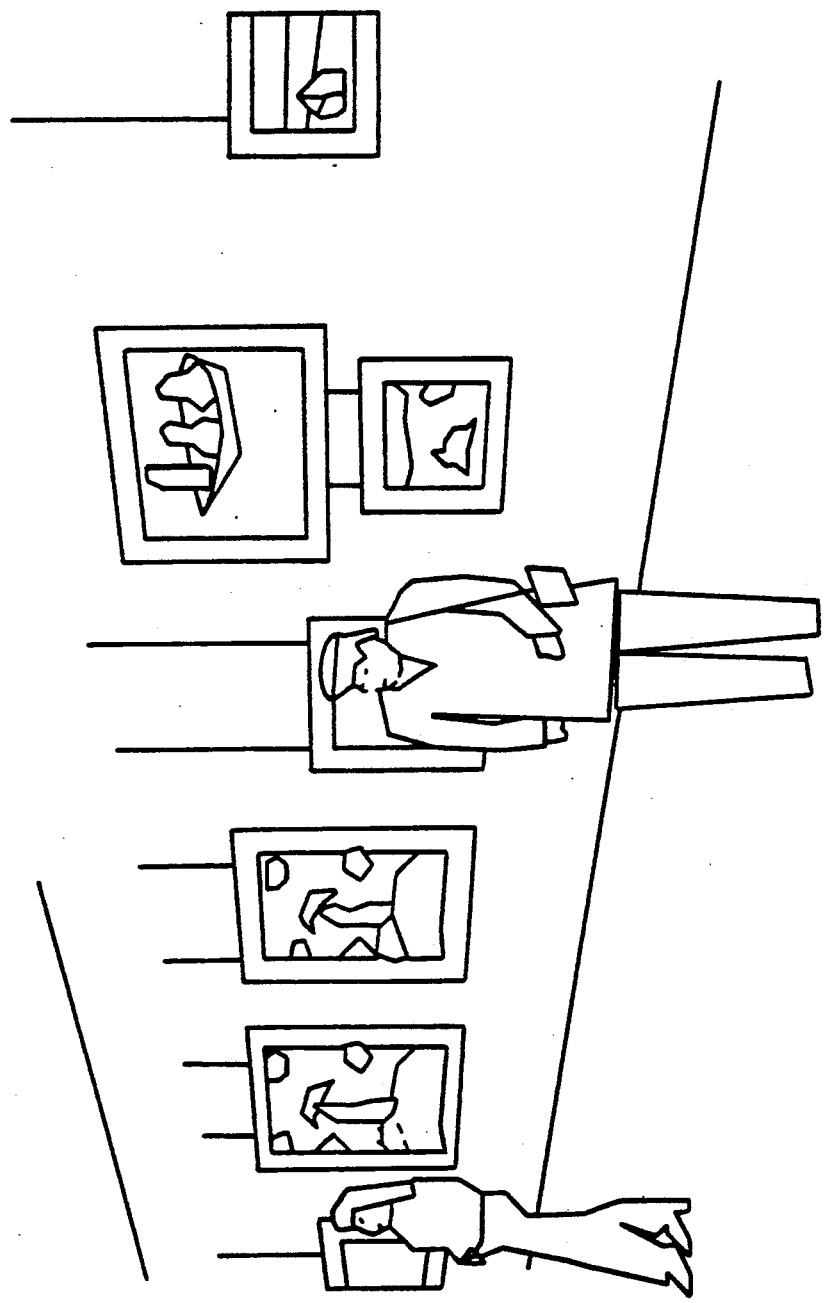
FIG. 9 shows the same scene as FIG. 8 where the subject has moved.
Figure 11A:
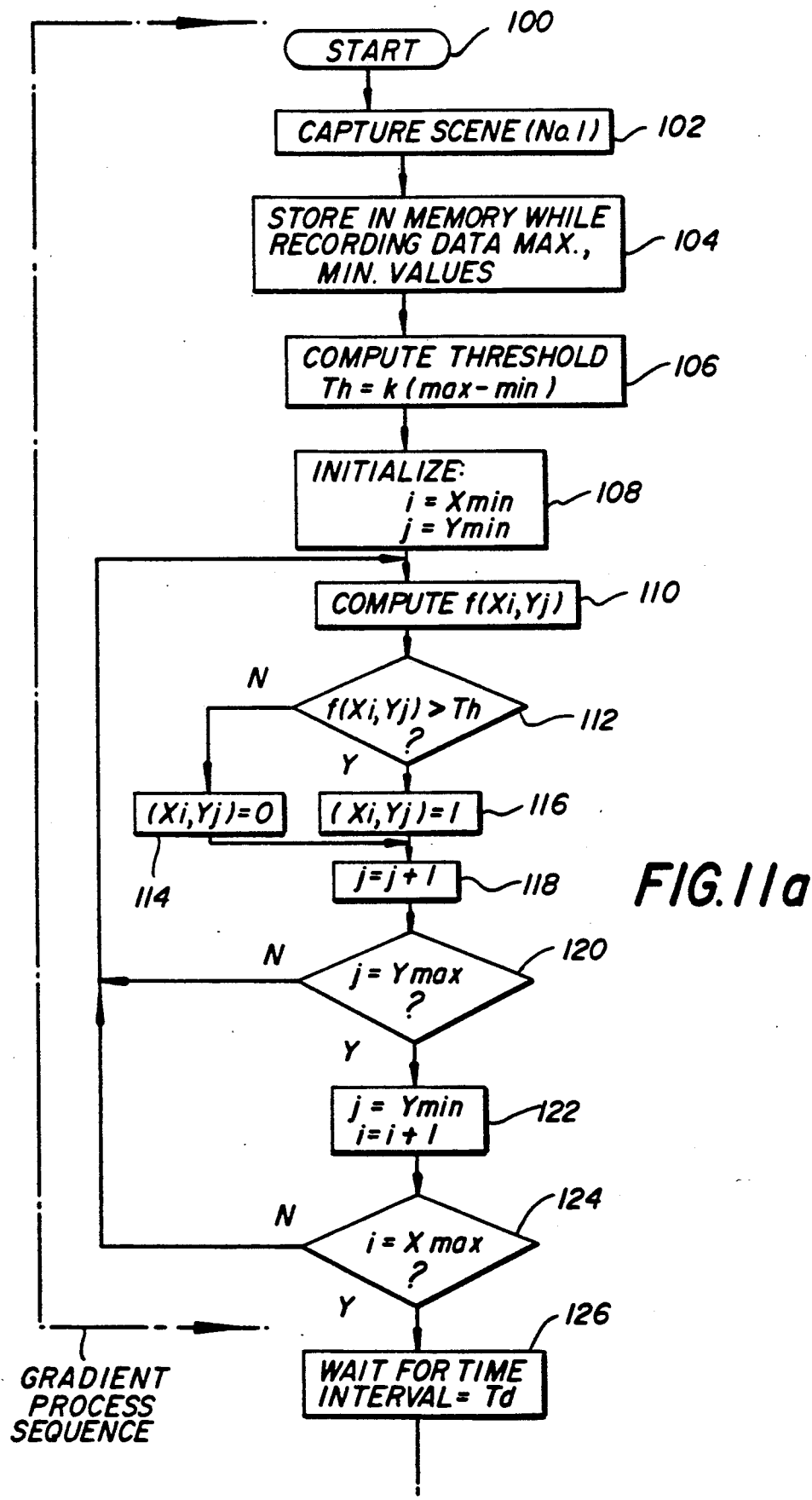
FIGURES 11a–11d show a flow diagram indicating the method for detecting image motion.
Figure 11B:
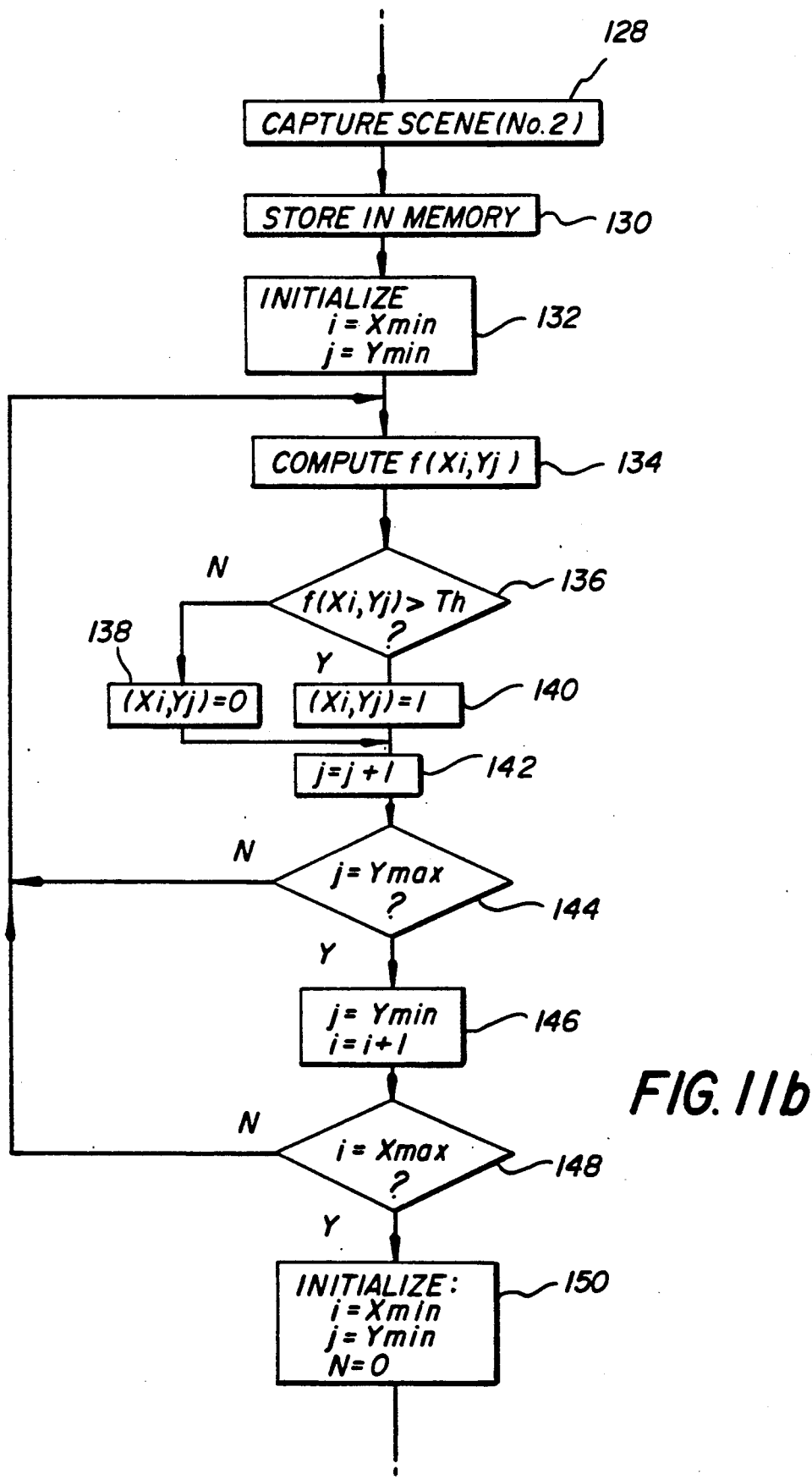
Figure 11C:
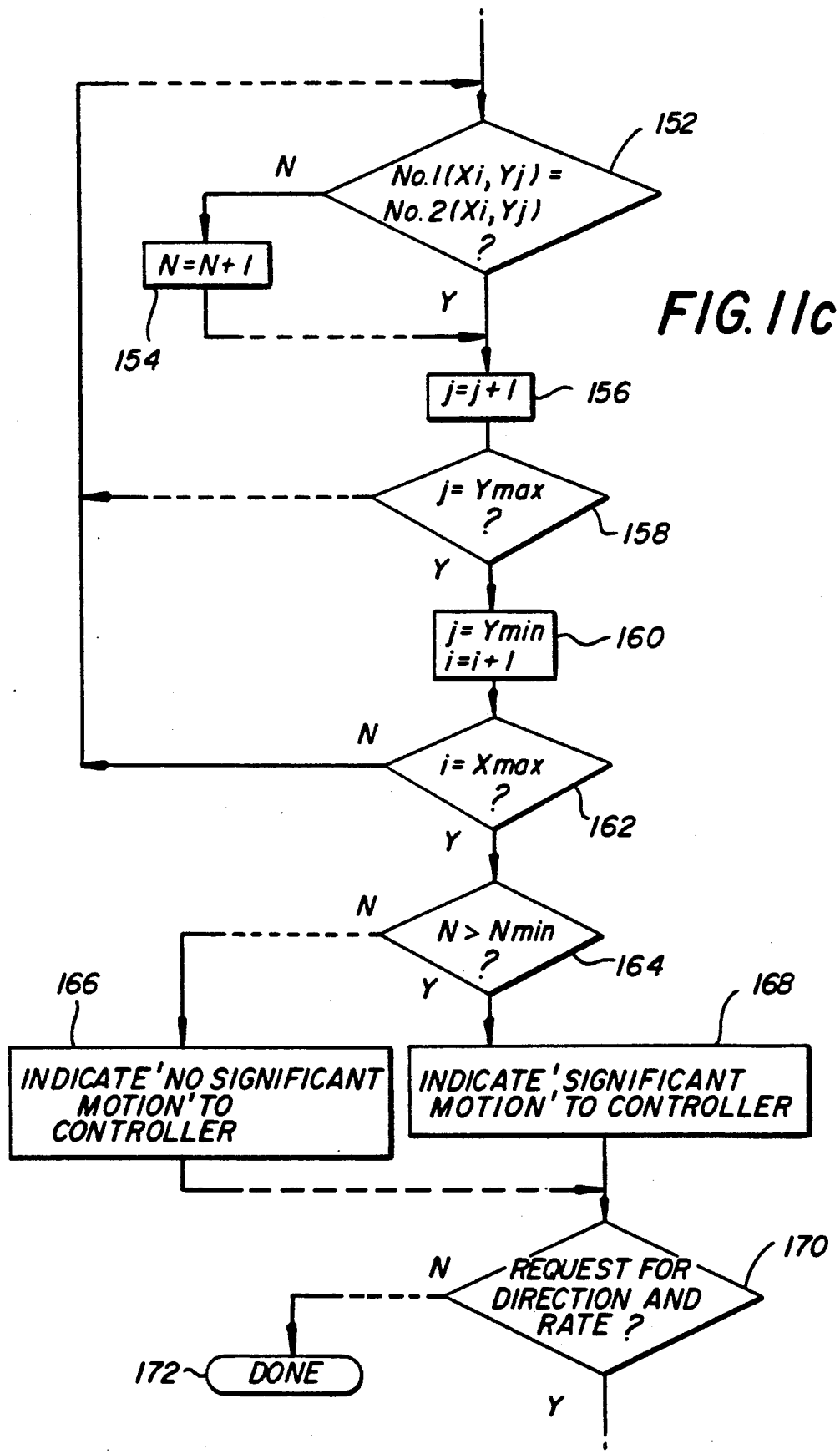
Figure 11D:
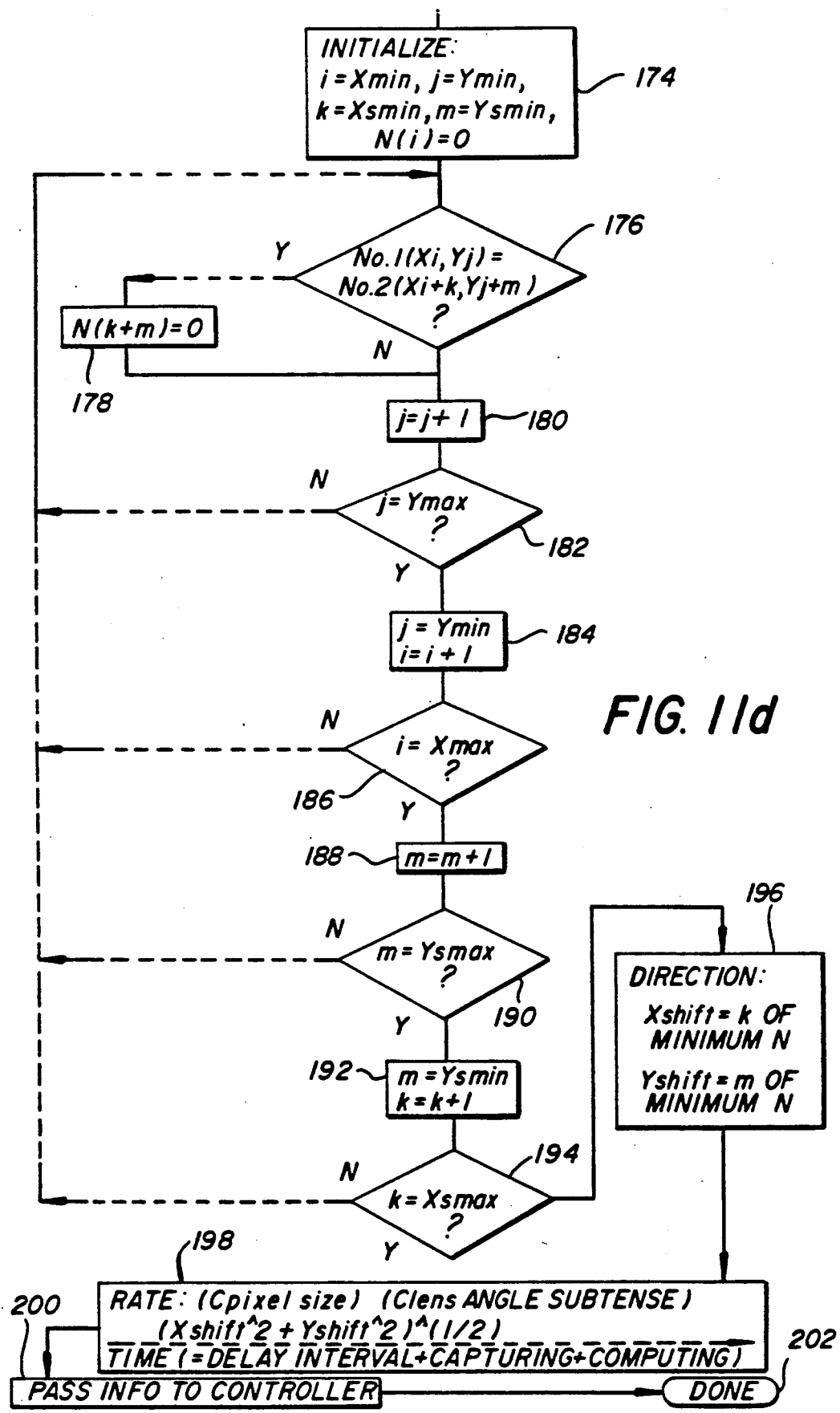

In addition to the functions described above, it is also possible for the device to then detect the motion of the subject. The motion detection function is shown in FIGS. 7 to 11. FIGURES 11a to 11d form a single flow chart when arranged one above each other in order. This combined flow chart is hereinafter referred to as FIG. 11. As mentioned before, FIG. 7 shows the original scene. This scene is captured as indicated in step 102 in FIG. 11a. This image is subject to the remainder of the gradient process as described above and as shown in steps 110 to 124. The result of this is an outline of the first scene as shown in FIG. 8. The motion detector 72 in FIG. 4 receives this outline and stores all or selected portions of the outline image. After waiving for a short interval of time a second image is captured as indicated in steps 126 and 128. An outline of this image is also taken according to the gradient operation as shown in steps 130 to 148. FIG. 9 shows the outline thus formed of the second image where the subject has moved her arms but where the remainder of the image remains the same. In steps 150 to 162, the motion detector compares pixels in the first outline with the corresponding pixel location in the second outline. For each pixel pair that differs in value, a counter is incremented (step 156). After all desired portions of the image have been compared the number of different pixels is evaluated to see if a significant motion was present. The evaluation is shown in steps 164 to 168. In step 164 $N_{min}$ is a minimun number of pixels required by the system to indicate significant motion. If no motion occurred over the measurement interval, the two images will match and the pixel by pixel comparison will result in most pixels being the same. If motion did occur, the number of pixel pairs which differ between the two images will be significant.

If a predetermined amount of change occurs, the motion detector can supply an indication of this to the shutter controller to limit the slowest shutter speed thus avoiding any possibility that the photograph will be blurred. Alternatively, the controller may enable a warning light for the photographer indicating that a blurred image may occur.

The detection of the motion may also be used in conjunction with a burst exposure mode. Previously, a burst exposure mode was used to trigger sequential pictures with a predetermined time between shots. In the present invention if burst mode is chosen by the photographer, the controller may initiate a picture capture upon receipt of each indication of a predetermined amount of required movement. Thus, the pictures would be taken with uniform movement of the subject between shots rather than at uniform time periods. This could be very useful for capturing moving subjects and for camera panning.

It is also possible to use motion detection signal to track the subject in order to avoid a blurred image. In order to do this it is necessary to determine the direction and rate of movement by using additional processing applied to the two images. This determination is shown in steps 170 and 200 of FIG. 11. Using the same type of comparison described above, the portions are re-examined for matching but after being shifted. Thus the two images are shifted relative to each other in a horizontal, vertical or combined direction. The direction of shift required to bring the two images back into registration indicates the direction of motion. The amount of shift together with the total time elapsed between the images indicates the rate of motion. This information can then be used by the controller to adjust the shutter speed or to help track a subject.

In order to track the subject, the direction information can be sent to a camera mount which has stepper motors to position the camera automatically. The rate information can be used to determine when the next adjustment is to be made and when the next picture should be taken. The camera can select the subject to be tracked in a variety of ways. For example the photographer can aim the small center fidicials in the viewfinder at the subject while indication the tracking mode and depressing the shutter button.

FIG. 1A shows a situation where the image shown in FIG. 8 appears to move due to the movement of the camera rather than the subject. The image movement may be determined according to the steps of FIG. 11. This is demonstrated in FIG. 10b and 10c which show the same part of the picture in each of two sequential images. If the image in this small area is approximately the same but merely shifted and if the same shift is evident in other sampled parts of the picture the motion detector can determine that the camera itself is moved rather than the subject. The shutter speed can then be limited, a warning light enabled or tracking instituted in the same manner as if the subject is moving. However, here the shutter speed adjustment might be different than the came where the subject is moving, since camera motion ant subject motion affect the resulting image differently.

Figure 7:
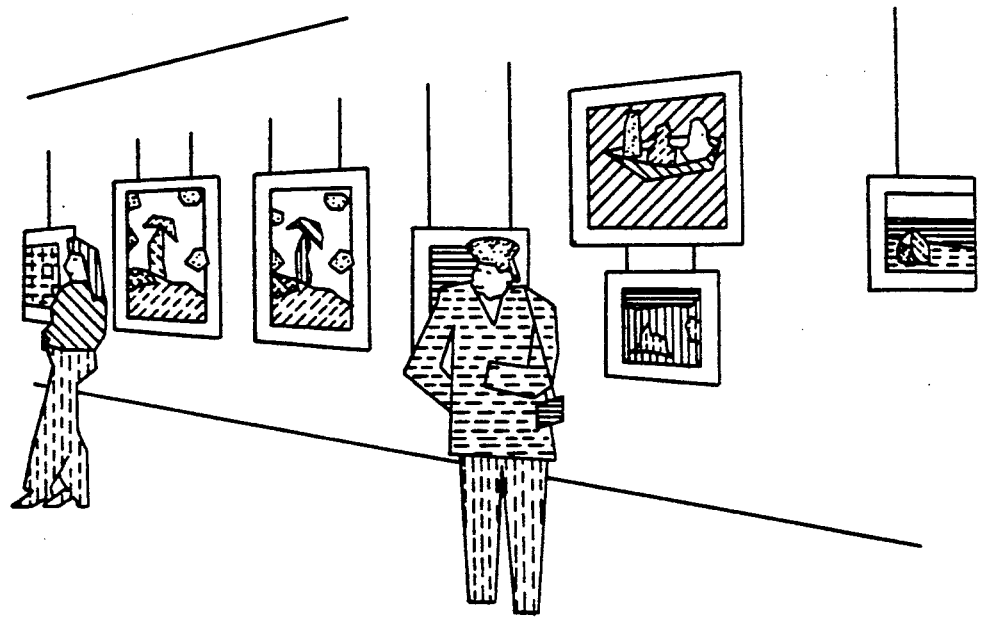
FIG. 7 shows an unaltered scene as viewed through the viewfinder of the present invention.
Figure 12:
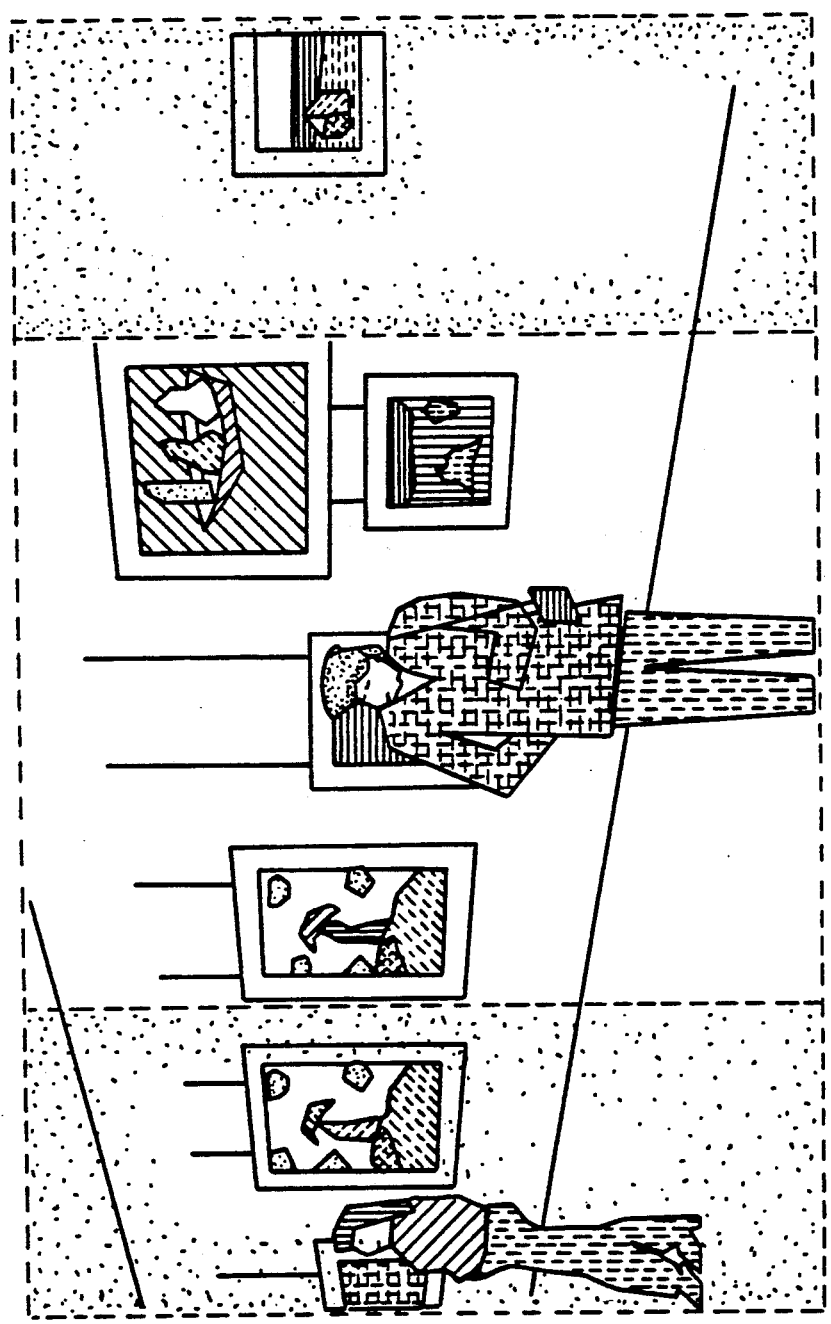
FIG. 12 shows an image through the viewfinder of the present invention with geometric highlighting of the depth of field.

FIG. 7 shows an unaltered image which can be seen in the viewfinder of the camera. FIG. 12 shows the same scene but with a geometric mask generated by the liquid crystal display array highlighting objects in the image. When such a figure is used to highlight the image, something is needed to determine the proper placement of the center of the highlighting figure. If the intent is merely to highlight the subject chosen by the autofocus, it is only necessary to convert the place in the scene chosen by the autofocus system to the coordinate plane of the display. If range finder autofocus is employed, then the spot chosen by the autofocus should serve as the center position for the highlighting. If a through-the-lens correlation autofocus is employed, then the center of the correlation array can serve as a center position for the figure. If more than one array is utilized, the one from which the focus setting is derived should serve as the center. These arrays have a fairly narrow field of view and thus are acceptable for centering.

Figure 15:
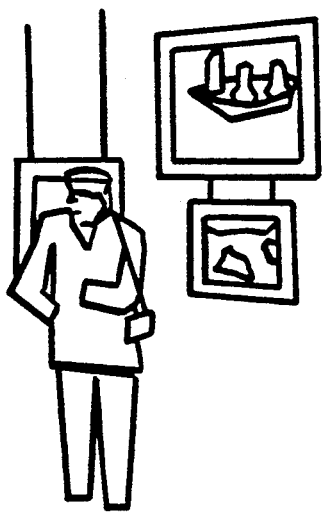
FIG. 15 shows the image of FIG. 14 after a dilation post-processing procedure.
Figure 16A:
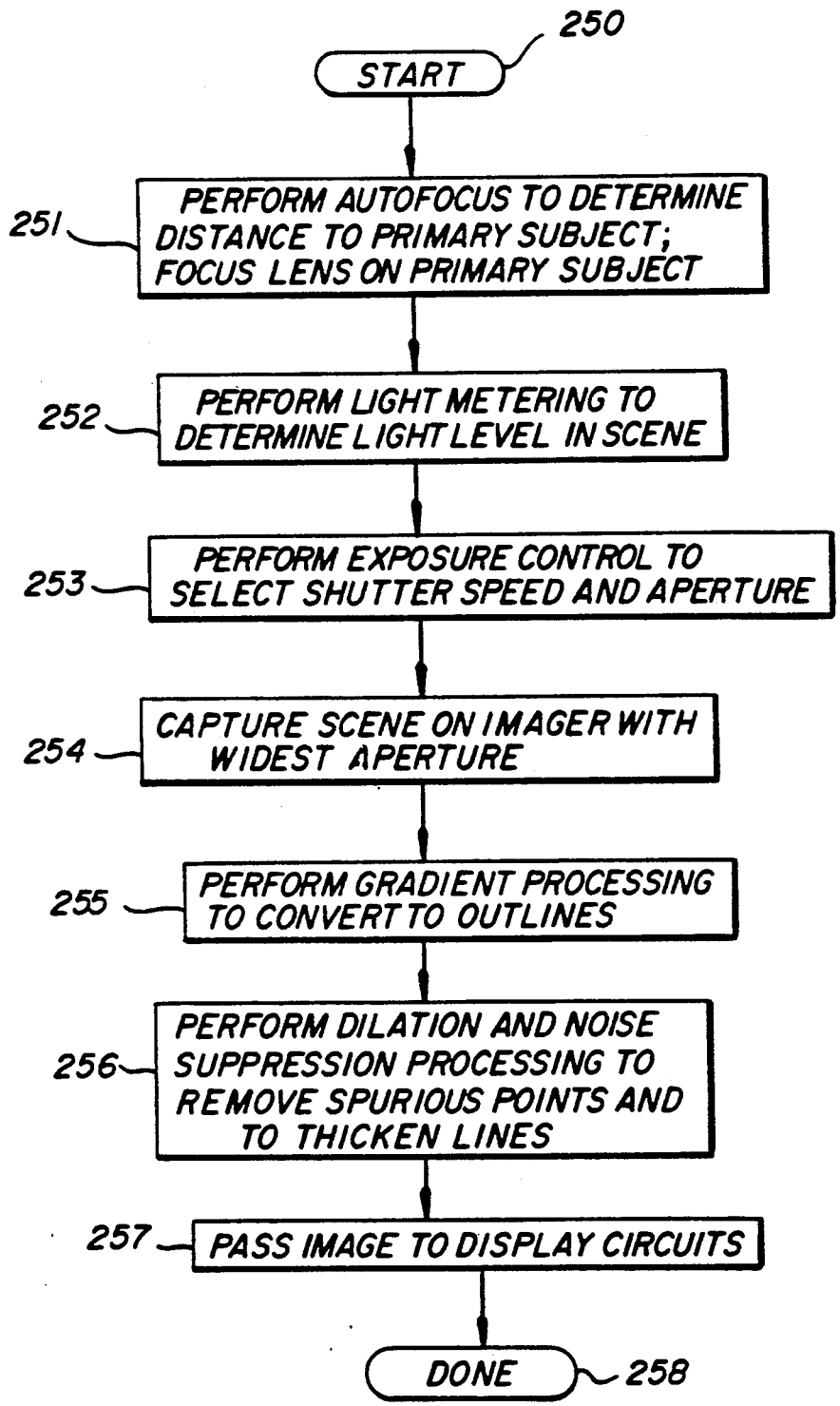
FIG. 16a is a flow diagram showing the steps of a method illustrated in FIGS. 13-15.

If a subject is to be highlighted in a manner following its outline, an additional step is required. The method for controlling the device during this operation is shown in FIG. 16a. Steps 250 to 253 perform the standard autofocus and exposure control operations. In step 254, the aperture is opened to its widest diameter giving the minimum depth of field. The image is then recaptured and gradient processing is performed, step 255. Because of the reduced depth of field, only subjects at the plane of focus will be sharp and thus outlined. The additional image processing, step 256, is performed, as shown pictorially in FIGS. 13 to 15.

Figure 13:
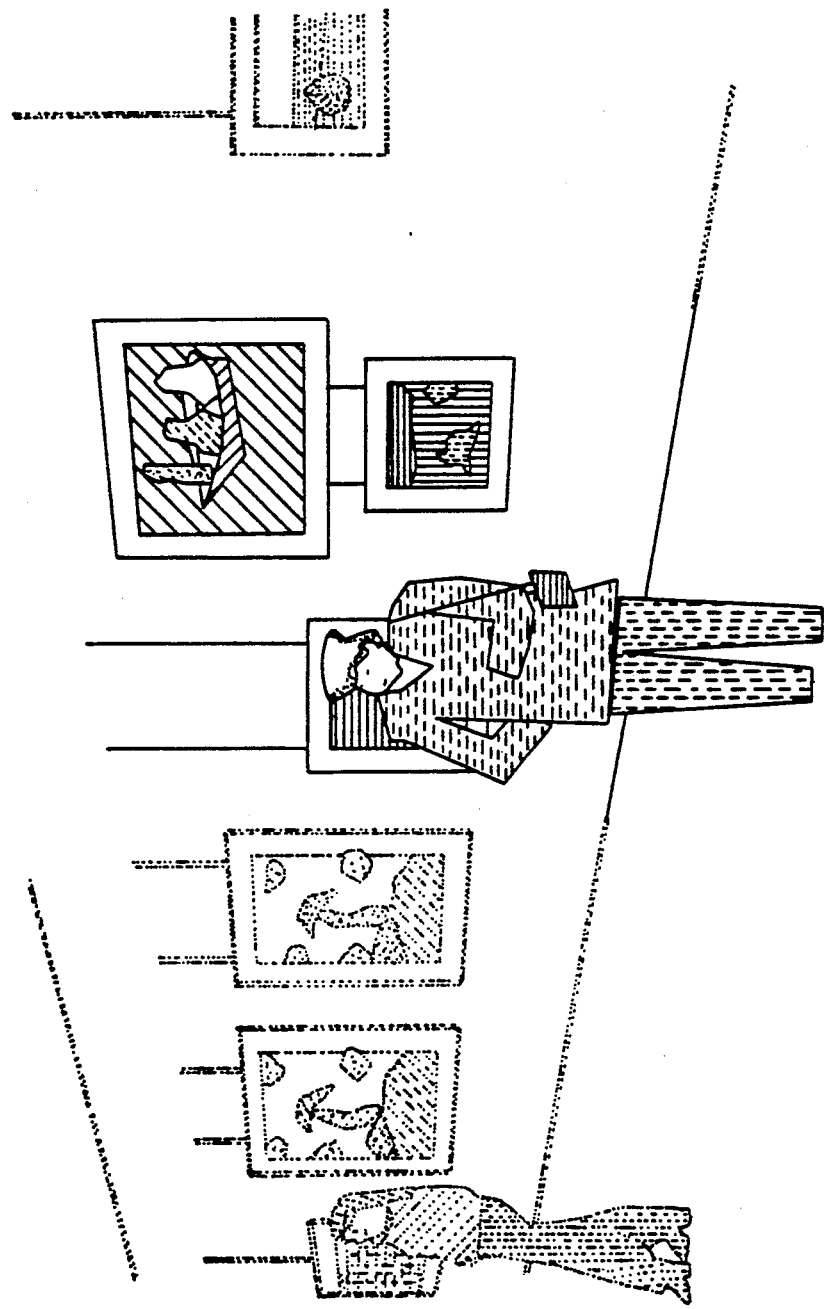
FIG. 13 shows an image of a scene with a very small depth of field.
Figure 14:
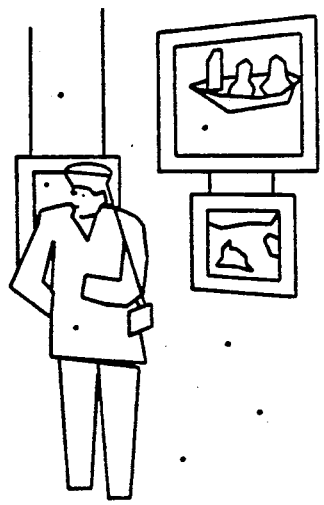
FIG. 14 shows the image of FIG. 13 after gradient processing.

FIG. 13 shows the image having a minimum depth of field. FIG. 14 shows the result of the gradient processing operation. FIG. 15 shows the result of the dilation and noise suppression operation using the moving window. It is clear that FIG. 14 shows most of the blurred images being removed and FIG. 15 shows the remaining points removed and the lines thickened.

In a manner similar to the moving window of the gradient processing operation, this dilation operation may be performed using a 3×3 pixel window in the following function:

$$f(x, y) = 1 \text{ if}$$

$$\sum_{m=-1}^{1} \sum_{n=-1}^{1} f(x + m, y + n) \geq 2, n, m \neq 0$$

$$f(x, y) = 0 \text{ otherwise}$$

In each pixel location, the function checks to see if there is a minimum number of logically true pixels immediately adjacent to the center pixel. If the condition is met, then the center pixel is also made logically true (1). If the condition is not met, then the center pixel is made logically false (0). Thus, this function looks at neighborhoods of pixels and serves two functions: to remove single spurious points and to thicken the image outlines. This image is then transferred to a display driver, step 257, providing the image highlighting feature.

Figure 16B:
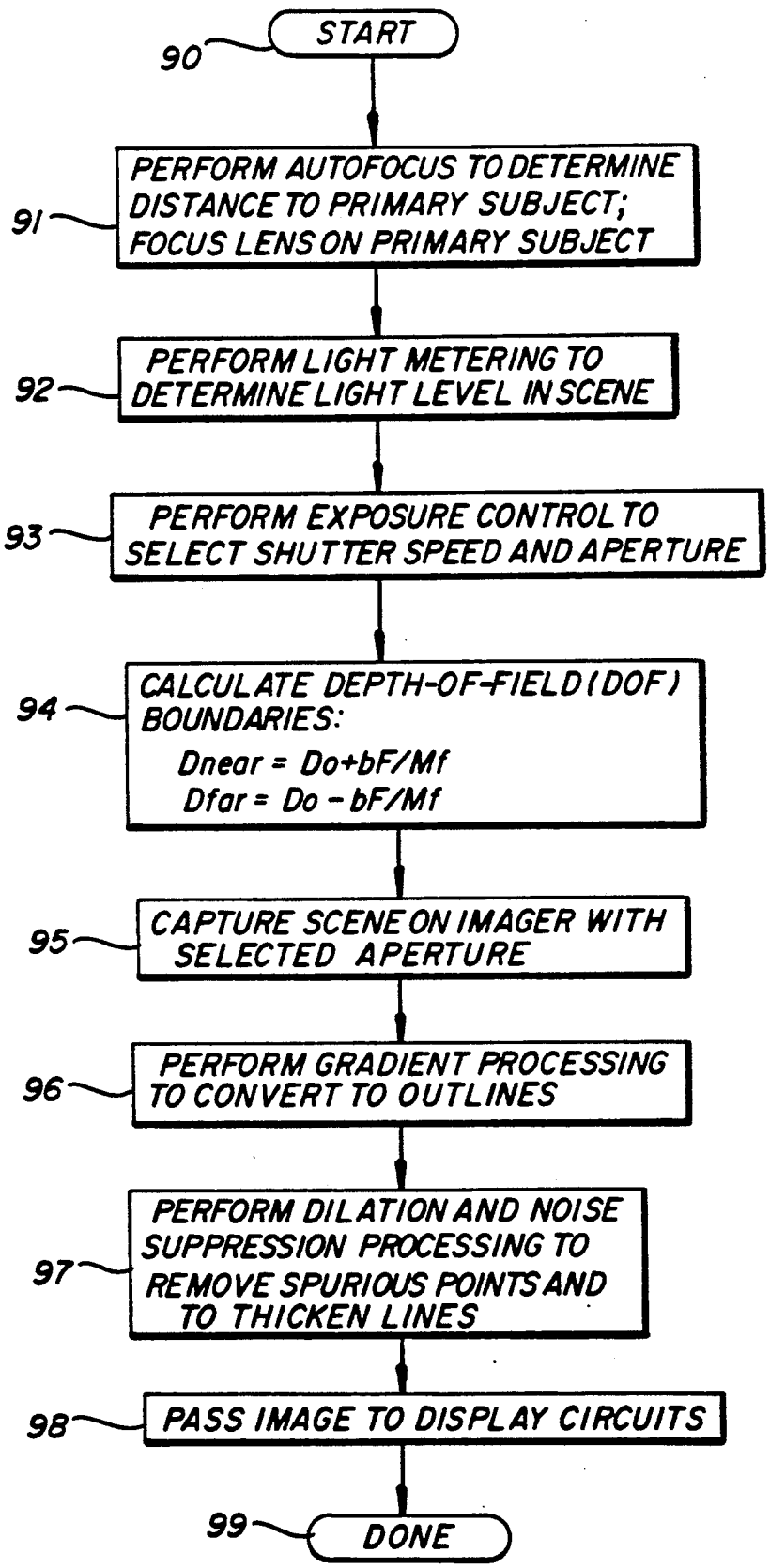
FIG. 16b is a flow diagram showing the steps of another method illustrated in FIGS. 13 to 15.

FIG. 16b shows the method for controlling the device for highlighting objects within the depth-of-field, i.e. depth-of-field preview mode. Steps 90 93 perform the standard autofocus and exposure control operations. In step 94 the depth of field is calculated. In this step $D_{near}$ is the near DOF distance, $D_{far}$ is the far DOF distance, $D_0$ is the distance to the autofocus subject, b is a constant which relates to the blur circle tolerance, F is the F number that the picture will be shot with, M is a constant for magnifying the film to the viewing size and f is the focal length of the lens. Step 95 indicates that the scene is captured with an aperture that will yield the same depth of field as the film image capture, as is shown in FIG. 13. Step 96 is the gradient processing which already has been described above in relation to FIGS. 5 and 6 and shown in more detail in FIG. 11 as steps 100 to 124. The result of this is shown in FIG. 14. The additional step to remove spurious points and to thicken lines is then performed in step 97 and the result shown in FIG. 15 Steps 98 and 99 then indicate that the image is displayed in standard form.

Another means of displaying the outline image to the user would be to combine it with a gray scale image. This could be achieved with a twisted nematic LCD placed off to the side of the viewfinder with a mirror switching between the actual scene and display scene. In a twisted nematic LCD, each pixel can take on a brightness value corresponding to a n-bit binary number. The outline image is then superimposed on the n-bit image by comparing each pixel in the outline image to the corresponding pixel in the n-bit image. If the pixel in the outline image has a 1 or true value, corresponding to a point in an outline feature, then the corresponding bit in the n-bit image is changed to M, where $0 < M < 2^n - 1$. If the pixel in the outline image has a 0 or false value, there the corresponding n-bit pixel is unaltered. The n-bit image can be either the original preprocessed image or one taken immediately before or after the aperture adjustment/capture step.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the U.S. is:

1. A method of indicating the subject to be photographed in a camera having a viewfinder, comprising the steps of:
   detecting an image;
   performing a gradient operation on elements of the image to produce an outline of the subjects that are in focus;
   detecting the outline of the subjects that are in focus based on the output of the gradient function; and
   highlighting the subjects that are in focus in the viewfinder.

2. The method according to claim 1, further comprising the step of storing the detected image in memory.

3. The method according to claim 2, further comprising the step of storing the output of the gradient operation in memory.

4. The method according to claim 1, further comprising the step of detecting movement of the image by comparing detected images at successive times.

5. The method according to claim 1, further comprising th step of detecting movement of the subject by comparing the outline of the subject at successive times.

6. The method according to claim 5, further comprising the step of enabling an indica&or light when motion is detected.

7. The method according to claim 5, further comprising the step of tracking the subject in response to the movement of the subject.

8. The method according to claim 7, further comprising the steps of:
   determining the direction of motion by shifting images and measuring the amount of shift; and
   determining the rate of motion by measuring the time interview between images.

9. The method according to claim 8, wherein the step of tracking uses the detected motion detection and motion rate.

10. The method according to claim 5, wherein the movement of the subject through a predetermined distance triggers additional pictures in a burst exposure mode.

11. The method according to claim 1, wherein the indication of the subject is a superposition of a geometric symbol over the subject in the viewfinder.

12. The method according to claim 1, wherein the indication of the subject is by superimposing a geometric symbol over objects within the depth of field.

13. The method according to claim 12, wherein the indication of the subject is by superimposing a mask over the outline of the subject.

14. The method according to claim 1, wherein the indication of the subject in the viewfinder is a highlighted outline.

15. The method according to claim 14, wherein the outline is formed by superimposing a mask on the outline of the subject.

16. The method according to claim 14, wherein the highlighting of the subject in the viewfinder is formed by a liquid crystal display.

17. The method according to claim 16, wherein the liquid crystal display is an encapsulated twisted nematic.

18. The method according to claim 16, wherein a half-silvered mirror passes the highlighting of the subject from the liquid crystal display to overlay the direct view found in the viewfinder.

19. The method according to claim 1, and further comprising the step of enhancing the outline of the subject by applying the function;

$$f'(x, y) = 1 \text{ if}$$

$$\sum_{m=-1}^{1} \sum_{n=-1}^{1} f(x + m, y + n) \geq 2, n, m = 0$$

otherwise make f'(x,y)=0 wherein, x,y correspond to the coordinate position of an element of the image.

20. The method according to claim 1, wherein the indication of the subject uses a gray scale image.

21. The method according to claim 20, wherein the image is formed using a twisted nematic LCD.

22. A camera comprising:
an array of sensors for detecting an image;
memory means for storing said image;
means for performing a gradient function on said stored image to produce an outline of the subjects in said image that are in focus; and
means for highlighting the subjects of said image that are in focus in accordance with the gradient function.

23. The camera according to claim 22, further comprising means for detecting motion of a subject.

24. The camera according to claim 23, wherein the means for highlighting includes all subjects within the depth of field of the picture.

25. The camera according to claim 22, further comprising a viewfinder including an encapsulated twisted nematic liquid crystal display for superimposing a mask over said image.

26. The camera according to claim 22, further comprising a viewfinder including a half-silvered mirror for combining the highlight from the liquid crystal display with the direct view.

27. A method of indicating the subject to be photographed in a camera having a viewfinder, comprising the steps of:
detecting an image;
performing the gradient operation $$f(x,y) = |(x,y)-(x+1,y+1)| + |(x+1,y)-(x,y+1)|$$

on elements of the image;
detecting the outline of the subject based on the output of the gradient function; and
indicating the subject in the viewfinder.

28. A method of indicating the subject to be photographed in a camera having a viewfinder, comprising the steps of:
detecting an image;
performing a gradient operation on elements of the image;
detecting the outline of the subject based on the output of the gradient function;
detecting movement of the subject by comparing the outline of the subject at successive times;
adjusting the shutter speed in response to the movement of the subject; and
indicating the subject in the viewfinder.

29. The method according to claim 28, wherein the shutter speed is set to a default.

30. A method of indicating the subject to be photographed in a camera having a viewfinder, comprising the steps of:
detecting an image;
capturing data with a predetermined aperture;
performing a gradient operation on elements of the image;
detecting the outline of the subject based on the output of the gradient function; and
highlighting the subject detected in the preceding step in the viewfinder.

31. A method of indicating the subject to be photographed in a camera having a viewfinder, comprising the steps of:
detecting an image;
performing a gradient operation on elements of the image;
detecting the outline of the subject based on the output of the gradient function;
detecting movement of the subject by comparing the outline of the subject at successive times;
adjusting the shutter speed in response to the movement of the camera; and
indicating the subject in the viewfinder.

* * * * *